United States Patent
Muroya et al.

(10) Patent No.: US 12,407,059 B2
(45) Date of Patent: Sep. 2, 2025

(54) GAS DISCHARGE VALVE OF BATTERY AND BATTERY

(71) Applicant: SANYO Electric Co., Ltd., Kadoma (JP)

(72) Inventors: Yohei Muroya, Hyogo (JP); Hiroshi Maesono, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 242 days.

(21) Appl. No.: 17/909,851

(22) PCT Filed: Jan. 19, 2021

(86) PCT No.: PCT/JP2021/001686
§ 371 (c)(1),
(2) Date: Sep. 7, 2022

(87) PCT Pub. No.: WO2021/181893
PCT Pub. Date: Sep. 16, 2021

(65) Prior Publication Data
US 2024/0204339 A1 Jun. 20, 2024

(30) Foreign Application Priority Data
Mar. 9, 2020 (JP) .................................. 2020-039613

(51) Int. Cl.
*H01M 50/342* (2021.01)

(52) U.S. Cl.
CPC .............................. *H01M 50/3425* (2021.01)

(58) Field of Classification Search
CPC .................. H01M 50/342; H01M 50/3425
See application file for complete search history.

(56) References Cited

U.S. PATENT DOCUMENTS

2003/0131880 A1    7/2003   Marubayashi et al.

FOREIGN PATENT DOCUMENTS

| JP | 2000-21380 A | 1/2000 |
|---|---|---|
| JP | 2003-187774 A | 7/2003 |
| JP | 2008-123726 A | 5/2008 |

(Continued)

OTHER PUBLICATIONS

Machine translation of WO-2014073518-A1 (Year: 2014).*

(Continued)

*Primary Examiner* — Eugenia Wang
(74) *Attorney, Agent, or Firm* — WHDA, LLP

(57) ABSTRACT

A valve body of a gas discharge valve includes a substantially annular main notch for opening the valve body and an auxillary notch provided in a region inside the main notch. The main notch and the auxillary notch are coupled to each other at least at one location. At a coupling portion between the main notch and the auxillary notch, the curvature of an inner corner of a bottom portion of the main notch is equal to or less than 0.05, and the curvature of an outer corner of the bottom portion is equal or greater than 0.05. Assuming that the thickness of the valve body at a portion thereof located in the opposite direction of the auxillary notch when viewed from the coupling portion is t1 and the thickness the valve body at a portion thereof located below the bottom portion of the main notch is t2, t2/t1≥0.16 is satisfied.

4 Claims, 6 Drawing Sheets

(56) References Cited

FOREIGN PATENT DOCUMENTS

JP        2008-251438 A     10/2008
WO    WO-2014073518 A1 *   5/2014  ......... H01M 50/103

OTHER PUBLICATIONS

Extended (Supplementary)European Search Report dated Oct. 23, 2023, issued in counterpart EP Application No. 21767274.0. (8 pages).
International Search Report dated Mar. 23, 2021, issued in counterpart International Application No. PCT/JP2021/001686, w/English partial translation (5 pages).
Office Action dated Oct. 18, 2022, issued in counterpart IN Application No. 202247056723, with English Translation. (5 pages).

* cited by examiner

GAS DISCHARGE VALVE OF BATTERY AND BATTERY

TECHNICAL FIELD

The present disclosure relates to a battery gas discharge valve and a battery.

BACKGROUND ART

A nonaqueous electrolyte secondary battery such as an alkaline secondary battery or a lithium ion battery has been used as an in-vehicle power source mounted on, e.g., an electric vehicle or a hybrid electric vehicle. In the nonaqueous electrolyte secondary battery, a great amount of gas is, in some cases, generated due to mishandling such as putting of the battery to the fire or charging/discharging of the battery under abnormal conditions. In these cases, such gas in the battery needs to be promptly released to the outside of the battery. For this reason, a gas discharge valve for promptly releasing the gas from the inside to the outside of the battery in an abnormal state is provided at the battery.

A battery gas discharge valve disclosed in Patent Document 1 has a track-shaped rupturable groove provided at an outer peripheral portion of a valve body and an auxiliary rupturable groove provided at the center of the valve body and coupled perpendicularly to each linear portion of the rupturable groove.

CITATION LIST

Patent Document

PATENT DOCUMENT 1: Japanese Unexamined Patent Publication No. 003-187774

SUMMARY OF INVENTION

In the structure of the gas discharge valve disclosed in Patent Document 1, when stress is on the gas discharge valve due to, e.g. vibration or impact when an electrode body and a current collector are connected using ultrasonic waves in battery manufacturing, cracks are caused at the rupturable groove at the outer peripheral portion of the valve body in some cases. In this case, there is a probability that the gas discharge valve is not stably activated when the internal pressure of the battery has increased.

A battery gas discharge valve as one aspect of the present disclosure is a battery gas discharge valve formed at a battery, the battery gas discharge valve including a thin valve body to be opened to release gas from the inside to the outside of the battery when the internal pressure of the battery has reached a predetermined value or greater.

The valve body includes a substantially annular main notch for opening the valve body and an auxiliary notch provided in a region inside the main notch,
  the main notch and the auxiliary notch are coupled to each other at least at one location.
  at a coupling portion between the main notch and the auxiliary notch, the curvature R1 of an inner corner of a bottom portion of the main notch is equal to or less than 0.05, and the curvature R2 of an outer corner of the bottom portion of the main notch is equal to or greater than 0.05, and t2/t1≥0.16 is satisfied assuming that the thickness of the valve body at a portion thereof located in the opposite direction of the auxiliary notch when viewed from the coupling portion is t1 and the thickness of the valve body at a portion thereof located below the bottom portion of the main notch is t2.

In the battery gas discharge valve as one aspect of the present disclosure, the shape of the main notch may be a track shape. In this case, the auxiliary notch may be coupled perpendicularly to a linear portion of the main notch.

A battery as one aspect of the present disclosure includes the above-described battery gas discharge valve as one aspect of the present disclosure.

According to one aspect of the present disclosure, stress caused due to an increase in the internal pressure of the battery can be concentrated on the inner corner of the bottom portion of the main notch, and the resistance of the outer corner of the bottom portion of the main notch vulnerable to stress caused in a shear direction due to, e.g., vibration or impact can be improved. Thus, the gas discharge valve can be stably activated when the internal pressure of the battery has increased.

DESCRIPTION OF EMBODIMENTS

Configuration of Secondary Battery

Hereinafter, a rectangular secondary battery will be described as an example of a secondary battery provided with a gas discharge valve according to an embodiment of the present disclosure with reference to the drawings. Note that the scope of the present invention is not limited to the embodiment below and changes can be made as necessary within the scope of the technical idea of the present disclosure.

Figure 1:
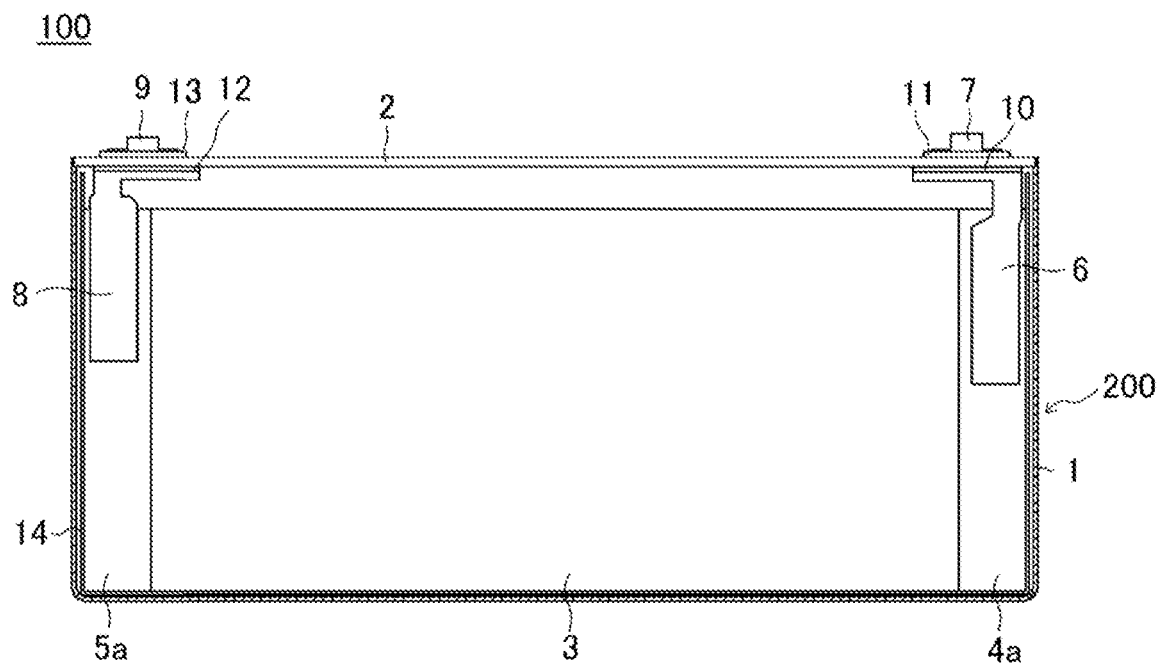
FIG. 1 FIG. 1 is a front view showing the inside of a secondary battery, which is provided with a gas discharge valve according to an embodiment, with a battery case front portion and an insulating sheet front portion of the secondary battery removed.
Figure 2:
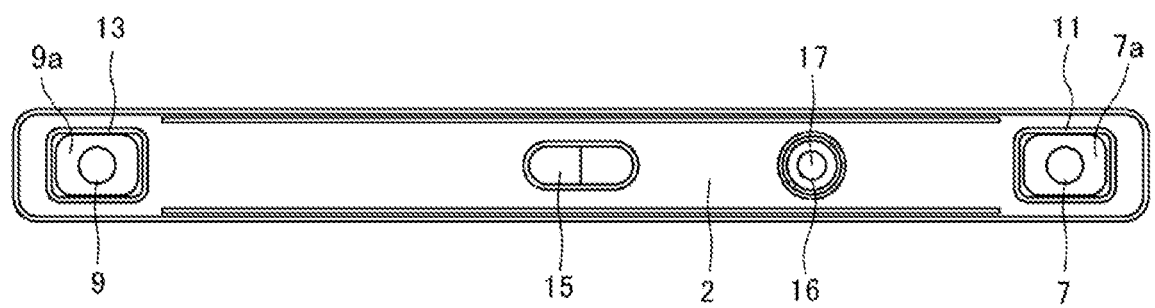
FIG. 2 is a top view of the secondary battery shown in FIG. 1.

FIG. 1 is a front view showing the inside of a rectangular secondary battery 100 with a battery case front portion and an insulating sheet front portion of the rectangular secondary battery 100 removed, and FIG. 2 is a top view of the rectangular secondary battery 100.

As shown in FIGS. 1 and 2, the rectangular secondary battery 100 includes a rectangular exterior body 1 having an opening on the upper side and a sealing plate 2 sealing the opening. The rectangular exterior body 1 and the sealing plate 2 form a battery case 200. Each of the rectangular exterior body 1 and the sealing plate 2 is made of metal, and for example, may be made of aluminum or aluminum alloy. In the rectangular exterior body 1, a flat wound electrode body 3 in which a long positive electrode plate and a long negative electrode plate are wound with a long separator interposed therebetween is housed together with a nonaqueous electrolyte. The positive electrode plate is configured such that a positive electrode active material layer including a positive electrode active material is formed on a metal positive electrode core, and has a positive electrode core exposed portion at which the positive electrode core is exposed along a longitudinal direction. The negative electrode plate is configured such that a negative electrode active material layer including a negative electrode active material is formed on a metal negative electrode core, and has a negative electrode core exposed portion at which the negative electrode core is exposed along a longitudinal direction. The positive electrode core may be, for example, made of aluminum or aluminum alloy. The negative electrode core may be, for example, made of copper or copper alloy.

On one end side of the wound electrode body 3 in the direction of extension of a winding axis, the positive electrode core 4a (i.e., the positive electrode core exposed portion) formed with no positive electrode active material layer is arranged with the layers of the positive electrode core 4a stacked on each other. The positive electrode core 4a is wound with neither the separator nor the negative electrode plate interposed, and therefore, the layers of the positive electrode core 4a are stacked on each other. A positive electrode current collector 6 is connected to the stacked layers of the positive electrode core 4a (hereinafter sometimes referred to as a positive electrode core stacked portion). The positive electrode current collector 6 may be, for example, made of aluminium or aluminum alloy.

On the other end side of the wound electrode body 3 in the direction of extension of the winding axis, the negative electrode core 5a (i.e., the negative electrode core exposed portion) formed with no negative electrode active material layer is arranged with the layers of the negative electrode core 5a stacked on each other. The negative electrode core 5a is wound with neither the separator nor the positive electrode plate interposed, and therefore, the layers of the negative electrode core 5a are stacked on each other. A negative electrode current collector 8 is connected to the stacked layers of the negative electrode core 5a (hereinafter sometimes referred to as a negative electrode core stacked portion). The negative electrode current collector 8 may be, for example, made of copper or copper alloy.

A positive electrode terminal 7 has a flange portion 7a arranged on the outer peripheral side of the sealing plate 2 and an insertion portion to be inserted into a through-hole provided at the sealing plate 2. The positive electrode terminal 7 is made of metal, and for example, may be made of aluminum or aluminum alloy. A negative electrode terminal 9 has a flange portion 9a arranged on the outer peripheral side of the sealing plate 2 and an insertion portion to be inserted into a through-hole provided at the sealing plate 2. The negative electrode terminal 9 is made of metal, and for example, may be made of copper or copper alloy. Note that the negative electrode terminal 9 may have a portion made of aluminum or aluminum alloy and a portion made of copper or copper alloy. In this case, the portion made of aluminum or aluminum alloy may protrude outward of the sealing plate 2 and the portion made of copper or copper alloy may be connected to the negative electrode current collector 8.

The positive electrode current collector 6 is fixed to the sealing plate 2 with a resin internal insulating member 10 interposed therebetween, and the positive electrode terminal 7 is fixed to the sealing plate 2 with a resin external insulating member 11 interposed therebetween. The negative electrode current collector 8 is fixed to the sealing plate 2 with a resin internal insulating member 12 interposed therebetween, and the negative electrode terminal 9 is fixed to the sealing plate 2 with a resin external insulating member 13 interposed therebetween.

The wound electrode body 3 is housed in the rectangular exterior body 1 in a state in which the wound electrode body 3 is covered with an insulating sheet 14. The sealing plate 2 is welded and connected to an opening edge of the rectangular exterior body 1 by, e.g., laser welding. The sealing plate 2 is formed with a gas discharge valve 15 for discharging gas when the internal pressure of the battery has reached a predetermined value or greater. The sealing plate 2 has an electrolytic solution injection hole 16, and after an electrolytic solution has been injected into the rectangular exterior body 1, the electrolytic solution injection hole 16 is sealed with a sealing plug 17.

For example, ultrasonic joining may be used for joining the positive electrode core 4a and the positive electrode current collector 6 or joining the negative electrode core 5a and the negative electrode current collector 8. Ultrasonic joining is performed in such a manner that vibration energy of ultrasonic waves is applied to joint surfaces while the stacked layers of the core and the current collector stacked on each other are sandwiched by a horn and an anvil.

Due to, e.g., vibration or impact in such ultrasonic joining, stress is on the gas discharge valve 15. For this reason, in the present embodiment, the valve body shape of the gas discharge valve 15 is designed as described later to improve the resistance of the gas discharge valve 15 against an external load such as vibration or impact.

Figure 3:
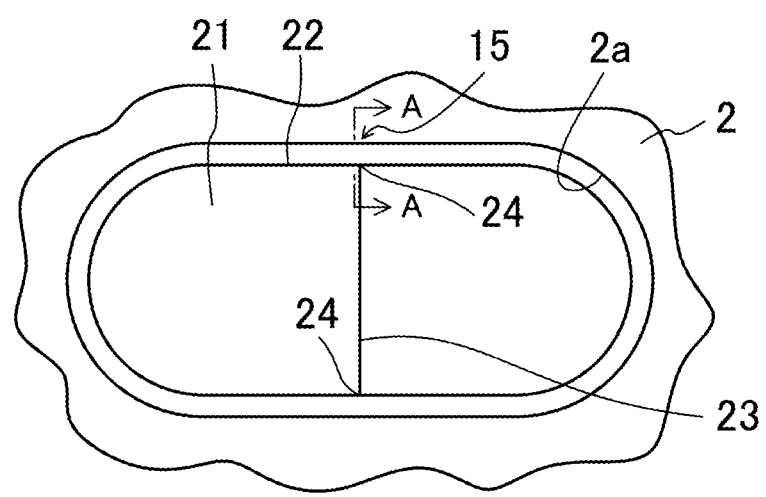
FIG. 3 is a plan view of the gas discharge valve of the battery according to the embodiment.

FIG. 3 is an enlarged view showing a planar configuration of the gas discharge valve 15. As shown in FIG. 3, the gas discharge valve 15 is provided to close a track-shaped hole 2a formed at the sealing plate 2. The gas discharge valve 15 includes, for example, a thin valve body 21 having a thickness of about 0.2 mu. The valve body 21 may be formed integrally with the sealing plate 2. The gas discharge valve 15 has a structure of opening the valve body 21 to release gas from the inside to the outside of the rectangular secondary battery 100 when the internal pressure of the battery has reached the predetermined value or greater.

Specifically, for easily opening the valve body 21, a track-shaped main notch 22 is formed at an outer peripheral portion of the valve body 21, and an auxiliary notch 23 is formed at a region of the valve body 21 inside the main notch 22. When the internal pressure of the rectangular secondary battery 100 has reached the predetermined value or greater, the main notch 22 and the auxiliary notch 23 are ruptured, and the hole 2a opens accordingly. The depth of the auxiliary notch 23 may be smaller than the depth of the main notch 22. Both ends of the auxiliary notch 23 are, for example, coupled perpendicularly to the center (a coupling portion 24) of each linear portion of the main notch 22. A pair of regions of the valve body 21 surrounded by the main notch 22 and the auxiliary notch 23 may expand in a battery outward direction in, e.g., a dome shape in order to more easily open the valve body 21.

According to the gas discharge valve 15 shown in FIG. 3, when the internal pressure of the battery has been applied, great stress is on the auxiliary notch 23 in response to a force of deforming the region inside the main notch 22. Since both ends of the auxiliary notch 23 are coupled to the main notch 22 at the coupling portions 24, the above-described stress is concentrated on the coupling portions 24. As a result, when the internal pressure of the battery has increased, the valve body 21 is reliably ruptured from the coupling portions 24, and the gas discharge valve 15 is promptly activated.

Hereinafter, details of the shape of the valve body 21 of the gas discharge valve 15 will be described with reference to first to fifth examples and first to fifth comparative examples.

First Example

Figure 4:
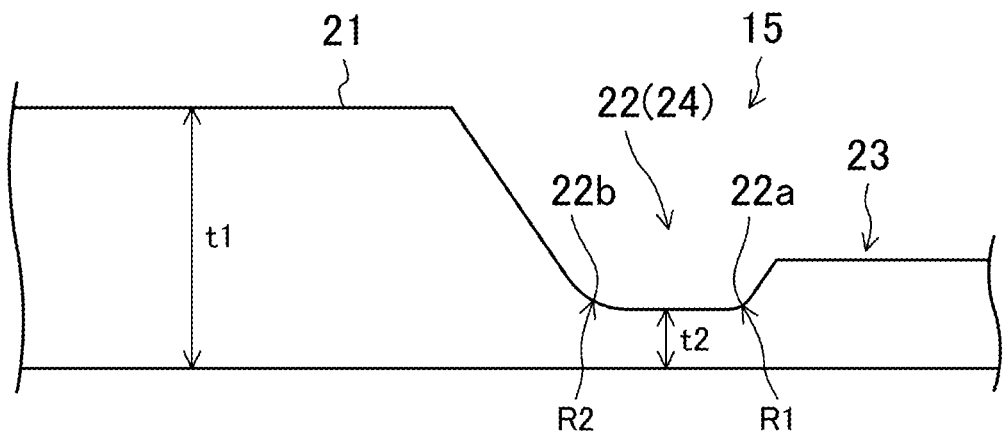
FIG. 4 is a sectional view of a coupling portion between a main notch and an auxiliary notch at a gas discharge valve of a battery of a first example and the vicinity thereof.

FIG. 4 is a sectional view of the coupling portion 24 between the main notch 22 and the auxiliary notch 23 at the gas discharge valve 15 of the first example and the vicinity thereof. Note that FIG. 4 shows one example of a sectional configuration along an A-A line of FIG. 3.

In the first example, at the coupling portion 24, the curvature R1 of an inner corner 22a of a bottom portion of the main notch 22 is 0.02, and the curvature R2 of an outer corner 22b of the bottom portion of the main notch 22 is 0.05. Assuming that the thickness of the valve body 21 at a portion thereof located in the opposite direction of the auxiliary notch 23 when viewed from the coupling portion 24 is t1 and the thickness of the valve body 21 at a portion thereof located below the bottom portion of the main notch 22 is t2, t1=0.18 mm, t2=0.03 mm, and t2/t1=0.167 are satisfied.

Table 1 below shows the above-described dimensions in the first example and simulation results of the stress on the coupling portion 24 due to, e.g., vibration when the electrode body and the current collector are joined by ultrasonic joining in battery manufacturing. As shown in Table 1, the stress on the coupling portion 24 in the first example is 104.35 MPa, and is smaller than 105 MPa which is the lower limit of an unacceptable stress.

Note that in stress calculation, an anvil-contacting region of the current collector is vibrated under predetermined vibration conditions (a frequency of 20 kHz, an amplitude of 0.015 mm). These vibration conditions are set assuming equivalent anvil vibration based on each actual vibration measurement result of the horn and the anvil in a joint process. The lower limit (105 MPa) of the unacceptable stress is an actual measurement value derived from cases where the gas discharge valve 15 is damaged.

TABLE 1

|  | Notch Portion R Dimensions | | | Remaining Thickness (mm) | | | Stress (Unit: MPa) (Ultrasonic Vibration Resistance) | |
| --- | --- | --- | --- | --- | --- | --- | --- | --- |
|  | R2 | R1 |  | t1 | t2 | t2/t1 | | |
| First Example | 0.05 | 0.02 | R2 > R1 | 0.18 | 0.03 | 0.167 | ○ | 104.35 |
| Second Example | 0.05 | 0.03 | R2 > R1 | 0.18 | 0.03 | 0.167 | ○ | 104.35 |
| Third Example | 0.05 | 0.04 | R2 > R1 | 0.18 | 0.03 | 0.167 | ○ | 100.36 |
| Fourth Example | 0.1 | 0.02 | R2 > R1 | 0.18 | 0.03 | 0.167 | ○ | 102.55 |
| Fifth Example | 0.1 | 0.03 | R2 > R1 | 0.18 | 0.03 | 0.167 | ○ | 102 |
| First Comparative Example | 0.02 | 0.02 | R2 = R1 | 0.38 | 0.03 | 0.079 | x | 120.79 |
| Second Comparative Example | 0.02 | 0.02 | R2 = R1 | 0.28 | 0.03 | 0.107 | x | 118.74 |
| Third Comparative Example | 0.02 | 0.02 | R2 = R1 | 0.18 | 0.03 | 0.167 | x | 109.03 |
| Fourth Comparative Example | 0.02 | 0.04 | R2 < R1 | 0.18 | 0.03 | 0.167 | x | 109.03 |
| Fifth Comparative Example | 0.1 | 0.03 | R2 > R1 | 0.3 | 0.03 | 0.100 | x | 111.13 |

*"less than 105" is taken as favorable.

Second Example

Figure 5:
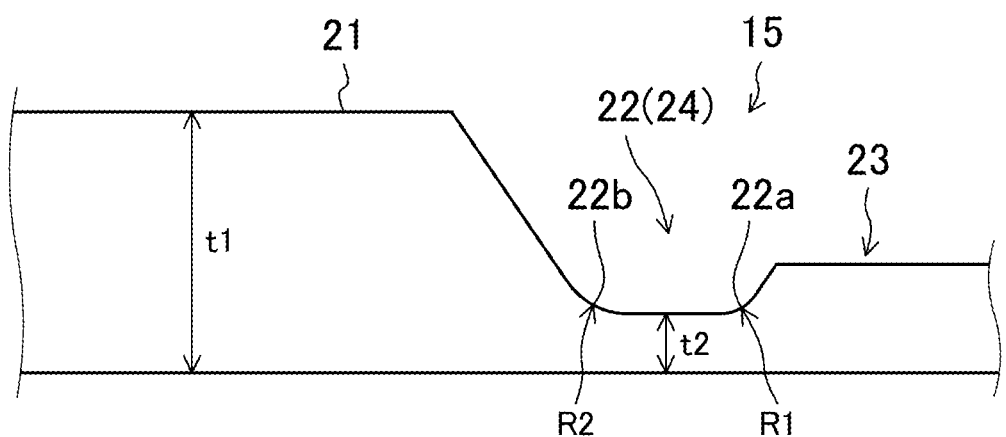
FIG. 5 is a sectional view of a coupling portion between a main notch and an auxiliary notch at a gas discharge valve of a battery of a second example and the vicinity thereof.

FIG. 5 is a sectional view of the coupling portion 24 between the main notch 22 and the auxiliary notch 23 at the gas discharge valve 15 of the second example and the vicinity thereof. Note that FIG. 5 shows one example of the sectional configuration along the A-A line of FIG. 3.

In the second example, at the coupling portion 24, the curvature R1 of the inner corner 22a of the bottom portion of the main notch 22 is 0.03, and the curvature R2 of the outer corner 22b of the bottom portion of the main notch 22 is 0.05. Assuming that the thickness of the valve body 21 at a portion thereof located in the opposite direction of the auxiliary notch 23 when viewed from the coupling portion 24 is t1 and the thickness of the valve body 21 at a portion thereof located below the bottom portion of the main notch 22 is t2, t1=0.18 mm, t2=0.03 mm, and t2/t1=0167 are satisfied.

Table 1 shows the above-described dimensions in the second example and simulation results of the stress on the coupling portion 24 due to, e.g., vibration when the electrode body and the current collector are joined by ultrasonic joining in battery manufacturing. As shown in Table 1, the stress on the coupling portion 24 in the second example is 104.35 MPa. and is smaller than 105 MPa which is the lower limit of the unacceptable stress. Note that stress calculation was performed as in the first example.

Third Example

Figure 6:
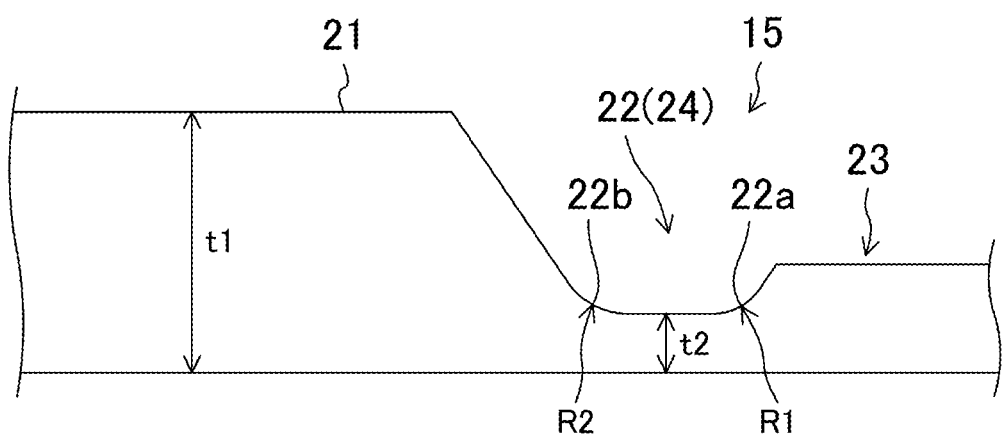
FIG. 6 is a sectional view of a coupling portion between a main notch and an auxilary notch at a gas discharge valve of a battery of third example and the vicinity thereof.

FIG. 6 is a sectional view of the coupling portion 24 between the main notch 22 and the auxiliary notch 23 at the gas discharge valve 15 of the third example and the vicinity thereof. Note that FIG. 6 shows one example of the sectional configuration along the A-A line of FIG. 3.

In the third example, at the coupling portion 24, the curvature R1 of the inner corner 22a of the bottom portion of the main notch 22 is 0.04, and the curvature R2 of the outer corner 22b of the bottom portion of the main notch 22 is 0.05. Assuming that the thickness of the valve body 21 at a portion thereof located in the opposite direction of the auxiliary notch 23 when viewed from the coupling portion 24 is t1 and the thickness of the valve body 21 at a portion thereof located below the bottom portion of the main notch 22 is t2, t1=0.18 mm, t2=0.03 mm, and t2/t1=0.167 are satisfied.

Table 1 shows the above-described dimensions in the third example and simulation results of the stress on the coupling portion 24 due to, e.g., vibration when the electrode body and the current collector are joined by ultrasonic joining in battery manufacturing. As shown in Table 1, the stress on the coupling portion 24 in the third example is 100.36 MPa, and is smaller than 105 MPa which is the lower limit of the unacceptable stress. Note that stress calculation was performed as in the first example.

Fourth Example

Figure 7:
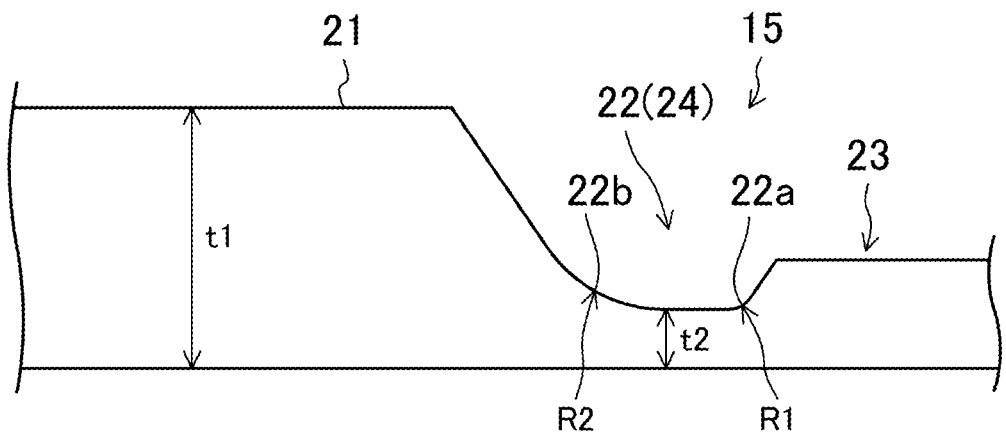
FIG. 7 is a sectional view of a coupling portion between a main notch and an auxiliary notch at a gas discharge valve of a battery of a fourth example and the vicinity thereof.

FIG. 7 is a sectional view of the coupling portion 24 between the main notch 22 and the auxiliary notch 23 at the gas discharge valve 15 of the fourth example and the vicinity thereof. Note that FIG. 7 shows one example of the sectional configuration along the A-A line of FIG. 3.

In the fourth example, at the coupling portion 24, the curvature R1 of the inner corner 22a of the bottom portion of the main notch 22 is 0.02, and the curvature R2 of the outer corner 22b of the bottom portion of the main notch 22 is 0.1. Assuming that the thickness of the valve body 21 at a portion thereof located in the opposite direction of the auxiliary notch 23 when viewed from the coupling portion 24 is t1 and the thickness of the valve body 21 at a portion thereof located below the bottom portion of the main notch 22 is t2, t1=0.18 mm, t2=0.03 mi and t2/t1=0.167 are satisfied.

Table 1 shows the above-described dimensions in the fourth example and simulation results of the stress on the coupling portion 24 due to, e.g., vibration when the electrode body and the current collector are joined by ultrasonic joining in battery manufacturing. As shown in Table 1, the stress on the coupling portion 24 in the fourth example is 102.55 MPa, and is smaller than 105 MPa which is the lower limit of the unacceptable stress. Note that stress calculation was performed as in the first example.

Fifth Example

Figure 8:
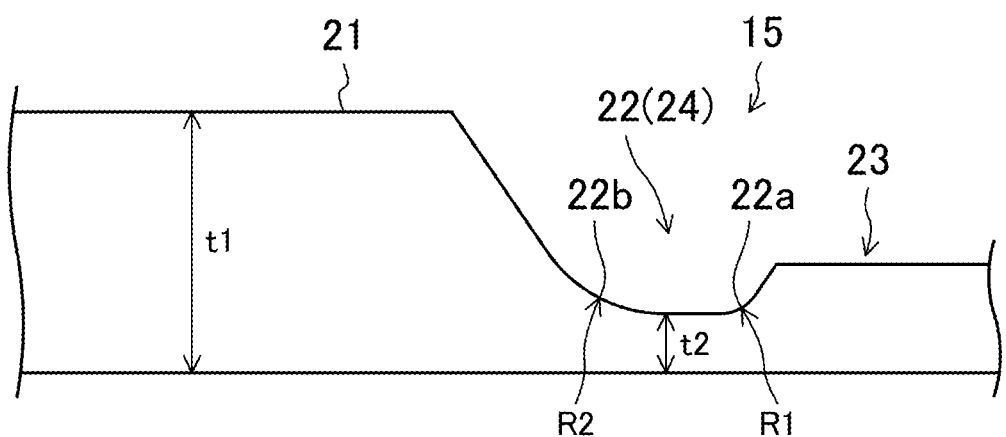
FIG. 8 is a sectional view of a coupling portion between a main notch and an auxiliary notch at a gas discharge valve of a battery of a fifth example and the vicinity thereof.

FIG. 8 is a sectional view of the coupling portion 24 between the main notch 22 and the auxiliary notch 23 at the gas discharge valve 15 of the fifth example and the vicinity thereof. Note that FIG. 8 shows one example of the sectional configuration along the A-A line of FIG. 3.

In the fifth example, at the coupling portion 24, the curvature R1 of the inner corner 22a of the bottom portion of the main notch 22 is 0.03, and the curvature R2 of the outer corner 22b of the bottom portion of the main notch 22 is 0.1. Assuming that the thickness of the valve body 21 at a portion thereof located in the opposite direction of the auxilary notch 23 when viewed from the coupling portion 24 is t1 and the thickness of the valve body 21 at a portion thereof located below the bottom portion of the main notch 22 is t2, t1=0.18 mm, t2=0.03 mm, and t2/t1=0.167 are satisfied.

Table 1 shows the above-described dimensions in the fifth example and simulation results of the stress on the coupling portion 24 due to, e.g, vibration when the electrode body and the current collector are joined by ultrasonic joining in battery manufacturing. As shown in Table 1, the stress on the coupling portion 24 in the fifth example is 102.00 MPa, and is smaller than 105 MPa which is the lower limit of the unacceptable stress. Note that stress calculation was performed as in the first example.

First Comparative Example

In the first comparative example, at the coupling portion 24, the curvature R1 of the inner corner 22a of the bottom portion of the main notch 22 is 0.02, and the curvature R2 of the outer corner 22b of the bottom portion of the main notch 22 is 0.02. Assuming that the thickness of the valve body 21 at a portion thereof located in the opposite direction of the auxiliary notch 23 when viewed from the coupling portion 24 is t1 and the thickness of the valve body 21 at a portion thereof located below the bottom portion of the main notch 22 is t2, t1=0.38 mm, t2=0.03 mm, and t2/t1=0.079 are satisfied.

Table 1 shows the above-described dimensions in the first comparative example and simulation results of the stress on the coupling portion 24 due to, e.g., vibration when the electrode body and the current collector are joined by ultrasonic joining in battery manufacturing. As shown in Table 1, the stress on the coupling portion 24 in the first comparative example is 120.79 MPa. and is greater than 105 MPa which is the lower limit of the unacceptable stress. Note that stress calculation was performed as in the first example.

Second Comparative Example

In the second comparative example, at the coupling portion 24, the curvature R1 of the inner corner 22a of the bottom portion of the main notch 22 is 0.02, and the curvature R2 of the outer corner 22b of the bottom portion of the main notch 22 is 0.02. Assuming that the thickness of the valve body 21 at a portion thereof located in the opposite direction of the auxiliary notch 23 when viewed from the coupling portion 24 is t1 and the thickness of the valve body 21 at a portion thereof located below the bottom portion of the main notch 22 is t2, t1=0.28 mm, t2=0.03 mm, and t2/t1=0.107 are satisfied.

Table 1 shows the above-described dimensions in the second comparative example and simulation results of the stress on the coupling portion 24 due to, e.g., vibration when the electrode body and the current collector are joined by ultrasonic joining in battery manufacturing. As shown in Table 1, the stress on the coupling portion 24 in the second comparative example is 118.74 MPa. and is greater than 105

MPa which is the lower limit of the unacceptable stress. Note that stress calculation was performed as in the first example.

Third Comparative Example

In the third comparative example, at the coupling portion 24, the curvature R1 of the inner corner 22a of the bottom portion of the main notch 22, is 0.02, and the curvature R2 of the outer corner 22b of the bottom portion of the main notch 22 is 0.02. Assuming that the thickness of the valve body 21 at a portion thereof located in the opposite direction of the auxilary notch 23 when viewed from the coupling portion 24 is t1 and the thickness of the valve body 21 at a portion thereof located below the bottom portion of the main notch 22 is t2, t1=0.28 mm, t2=0.03 mm, and t1/t1=0.107 are satisfied.

Figure 9:
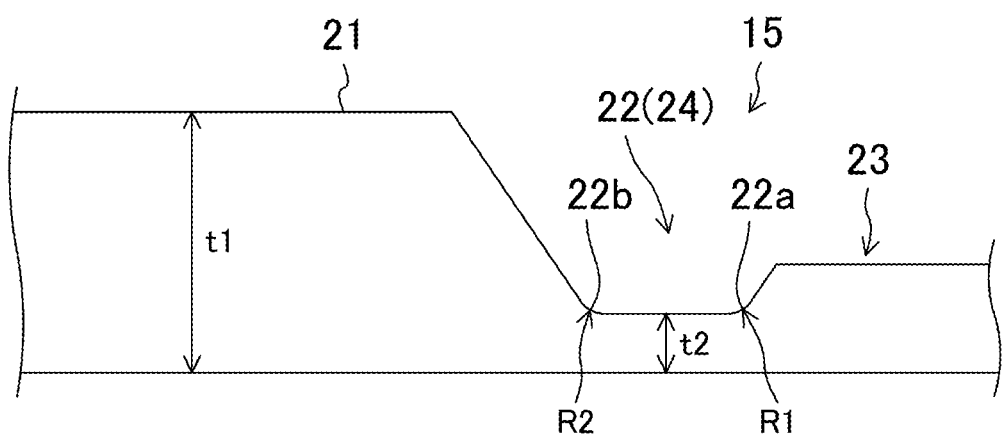
FIG. 9 is a sectional view of a coupling portion between a main notch and an auxiliary notch at a gas discharge valve of a battery of a third comparative example and the vicinity thereof.

FIG. 9 is a sectional view of the coupling portion 24 between the main notch 22 and the auxiliary notch 23 at the gas discharge valve 15 of the third comparative example and the vicinity thereof. Note that FIG. 9 shows one example of the sectional configuration along the A-A line of FIG. 3.

Table 1 shows the above-described dimensions in the third comparative example and simulation results of the stress on the coupling portion 24 due to, e.g., vibration when the electrode body and the current collector are joined by ultrasonic joining in battery manufacturing. As shown in Table 1, the stress on the coupling portion 24 in the third comparative example is 109.03 MPa, and is greater than 105 MPa which is the lower limit of the unacceptable stress. Note that stress calculation was performed as in the first example.

Fourth Comparative Example

In the fourth comparative example, at the coupling portion 24, the curvature R1 of the inner corner 22a of the bottom portion of the main notch 22 is 0.04, and the curvature R2 of the outer corner 22b of the bottom portion of the main notch 22 is 0.02. Assuming that the thickness of the valve body 21 at a portion thereof located in the opposite direction of the auxiliary notch 23 when viewed from the coupling portion 24 is t1 and the thickness of the valve body 21 at a portion thereof located below the bottom portion of the main notch 22 is t2, t1=0.18 mm, t2=0.03 mm, and t2/t1=0.167 are satisfied.

Figure 10:
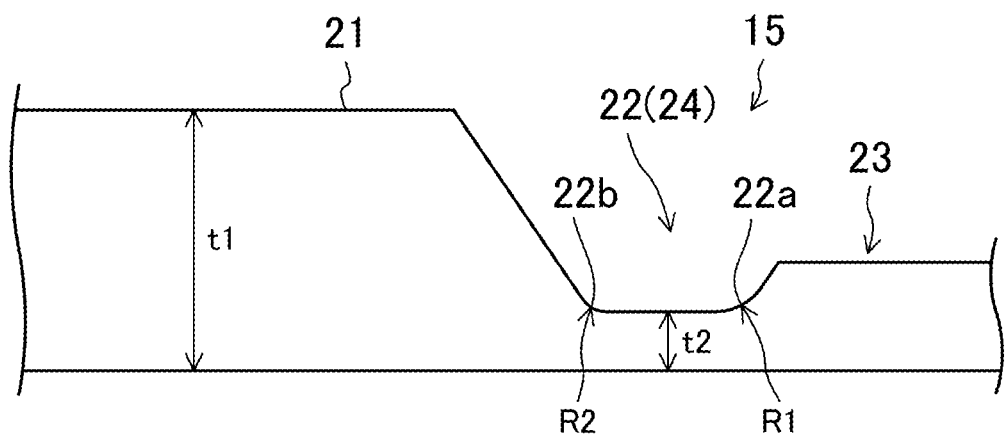
FIG. 10 is a sectional view of a coupling portion between a main notch and an auxiliary notch at a gas discharge valve of a battery of a fourth comparative example and the vicinity thereof.

FIG. 10 is a sectional view of the coupling portion 24 between the main notch 22 and the auxiliary notch 23 at the gas discharge valve 15 of the fourth comparative example and the vicinity thereof. Note that FIG. 10 shows one example of the sectional configuration along the A-A hue of FIG. 3.

Table 1 shows the above-described dimensions in the fourth comparative example and simulation results of the stress on the coupling portion 24 due to, e.g., vibration when the electrode body and the current collector are joined by ultrasonic joining in battery manufacturing. As shown in Table 1, the stress on the coupling portion 24 in the fourth comparative example is 109.03 MPa, and is greater than 105 MPa which is the lower limit of the unacceptable stress. Note that stress calculation was performed as in the first example.

Fifth Comparative Example

In the fifth comparative example, at the coupling portion 24, the curvature R1 of the inner corner 22a of the bottom portion of the main notch 22 is 0.03, and the curvature R2 of the outer corner 22b of the bottom portion of the main notch 22 is 0.1. Assuming that the thickness of the valve body 21 at a portion thereof located in the opposite direction of the auxiliary notch 23 when viewed from the coupling portion 24 is t1 and the thickness of the valve body 21 at a portion thereof located below the bottom portion of the main notch 22 is t2, t1=0.3 mm, t2=0.03 mm, and t2/t1=0.100 are satisfied.

Table 1 shows the above-described dimensions in the fifth comparative example and simulation results of the stress on the coupling portion 24 due to, e.g., vibration when the electrode body and the current collector are joined by ultrasonic joining in battery manufacturing. As shown in Table 1, the stress on the coupling portion 24 in the fifth comparative example is 111.13 MPa, and is greater than 105 MPa which is the lower limit of the unacceptable stress. Note that stress calculation was performed as in the first example.

Advantageous Effects of Embodiment

According to the first to fifth examples and the first to fifth comparative examples as described above, at the coupling portion 24 between the main notch 22 and the auxiliary notch 23 at the gas discharge valve 15 of the present embodiment, the curvature R1 of the inner corer 22a of the bottom portion of the main notch 22 is set equal to or less than 0.05, the curvature R2 of the outer corner 22b of the bottom portion of the main notch 22 is set equal to or greater than 0.05, and $t2/t1 \geq 0.16$ is set assuming that the thickness of the valve body 21 at a portion thereof located in the opposite direction of the auxiliary notch 23 when viewed from the coupling portion 24 is t1 and the thickness of the valve body 21 at a portion thereof located below the bottom portion of the main notch 22 is t2. With this configuration, the resistance of the valve body 21 against the external load such as vibration or impact is improved.

The outer corner 22b of the bottom portion of the main notch 22 is vulnerable to stress caused in a shear direction (the direction of normal to the sealing plate 2 in the present embodiment) due to, e.g., vibration or impact. For this reason, at the coupling portion 24 on which the stress is concentrated, the curvature R1 of the inner corner 22a of the bottom portion of the main notch 22 is set equal to or less than 0.05, and the curvature R2 of the outer corner 22b of the bottom portion of the main notch 22 is set equal to or greater than 0.05. With this configuration, the stress caused due to an increase in the internal pressure of the battery is easily concentrated on the inner corner 22a of the bottom portion of the main notch 22. Moreover, $t1/t1 \geq 0.16$ is set assuming that the thickness of the valve body 21 at a portion thereof located in the opposite direction of the auxiliary notch 23 when viewed from the coupling portion 24 is t1 and the thickness of the valve body 21 at a portion thereof located below the bottom portion of the main notch 22 is t2. In other words, the thickness t1 of the valve body 21 at a portion thereof located in the opposite direction of the auxiliary notch 23 when viewed from the coupling portion 24 is set thin so that the resistance to the stress in the shear direction at the outer corner 22b of the bottom portion of the main notch 22 can be improved. Thus, the gas discharge valve 15 can be stably activated when the internal pressure of the battery has increased.

The shape of the main notch 22 is the track shape at the gas discharge valve 15 of the present embodiment, and therefore, the gas discharge valve 15 is ruptured in a more-preferable shape. Thus, gas can be smoothly discharged. In this case, the auxiliary notch 23 is coupled perpendicularly to each linear portion of the main notch 22, and therefore, the gas discharge valve 15 is ruptured in a u-ich-more-preferable shape. This, gas can be more smoothly discharged.

Other Embodiments

The embodiment (including the examples, the same also applies below) of the present disclosure has been described above, but the present invention is not limited only to the above-described embodiment and various changes can be made within the scope of the disclosure. That is, description of the above-described embodiment is merely an example in nature, and is not intended to limit the present invention and application and use thereof.

For example, in the above-described embodiment, the rectangular secondary battery having the flat wound electrode body has been described as an example of the battery, but the type of battery is not particularly limited and the present disclosure is also applicable not only to a lithium ion secondary battery but also various batteries different from each other in an electrode body material or an electrolyte. The battery is not limited to the rectangular battery, and the present disclosure is also applicable to batteries in various shapes (e.g., a cylindrical shape).

Figure 11:
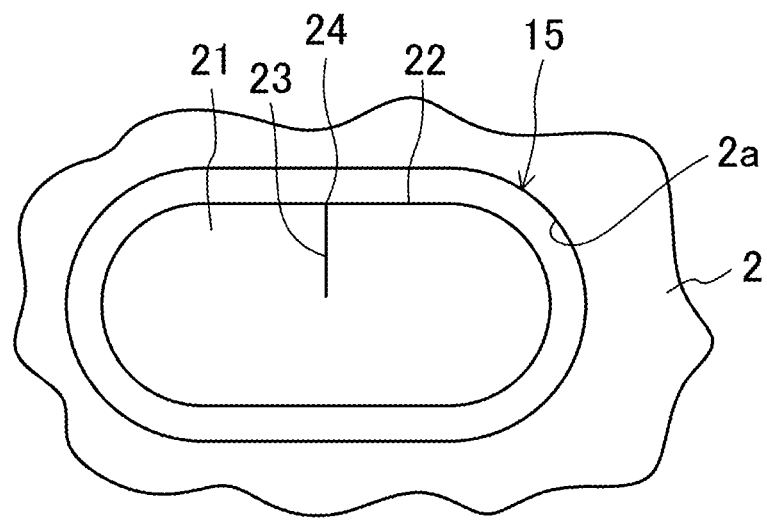
FIG. 11 is a plan view of a gas discharge valve of a battery of a variation.

In the above-described embodiment, both ends of the auxiliary notch 23 are coupled to the main notch 22. Instead, only one end of the auxiliary notch 23 may be coupled to the main notch 22 as shown in FIG. 11, for example.

Figure 12:
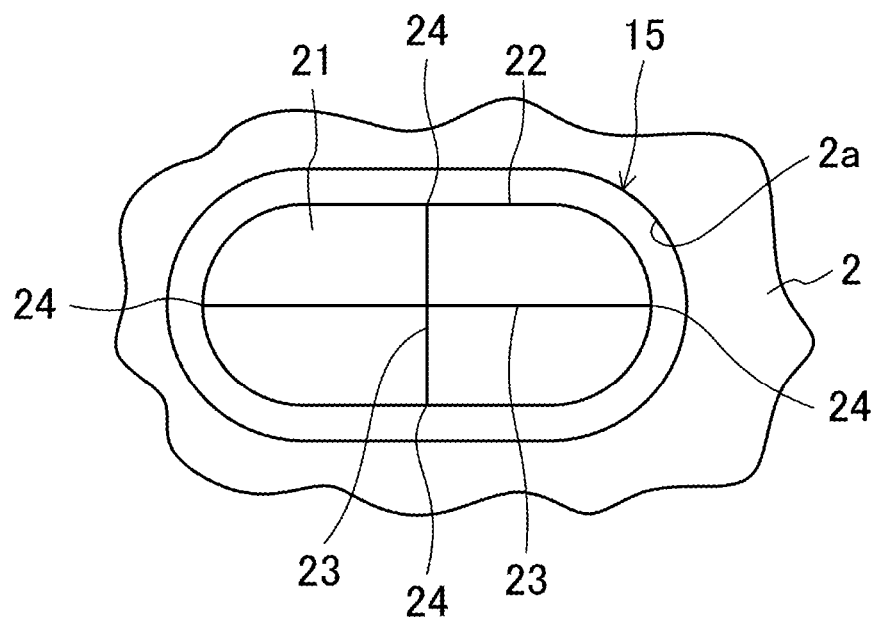
FIG. 12 is a plan view of a gas discharge valve of a battery of another variation.

In the above-described embodiment, only one auxiliary notch 23 is provided. Instead, two auxiliary notches 23 may be provided as shown in FIG. 12, or three or more auxiliary notches 23 may be provided, for example.

Figure 13:
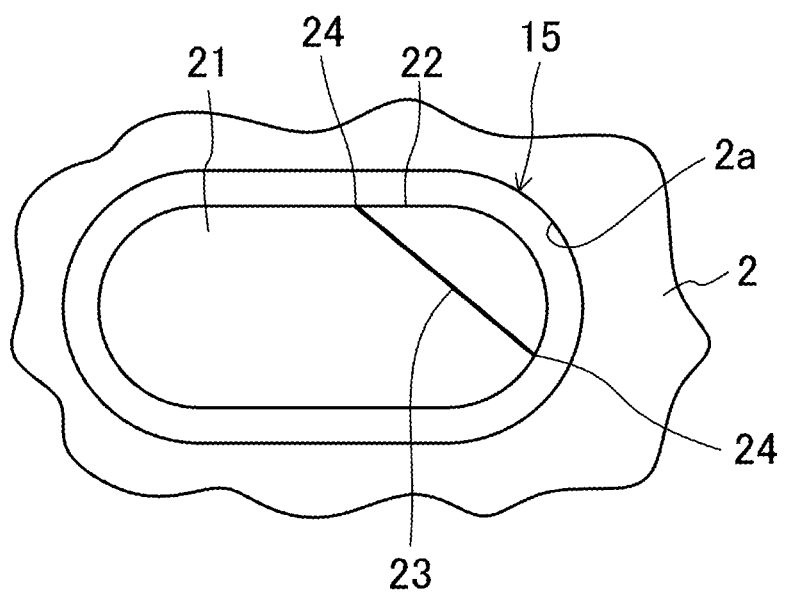
FIG. 13 is a plan view of a gas discharge valve of a battery of still another variation.

In the above-described embodiment, the auxiliary notch 23 is provided so as to pass through the center of the valve body 21. Instead, the auxiliary notch 23 may be provided so as not to pass through the center of the valve body 21 as shown in FIG. 13, for example. Moreover, in the above-described embodiment, the auxiliary notch 23 is coupled perpendicularly to the main notch 22, but may be coupled diagonally to the main notch 22 as shown in FIG. 13, for example.

Figure 14:
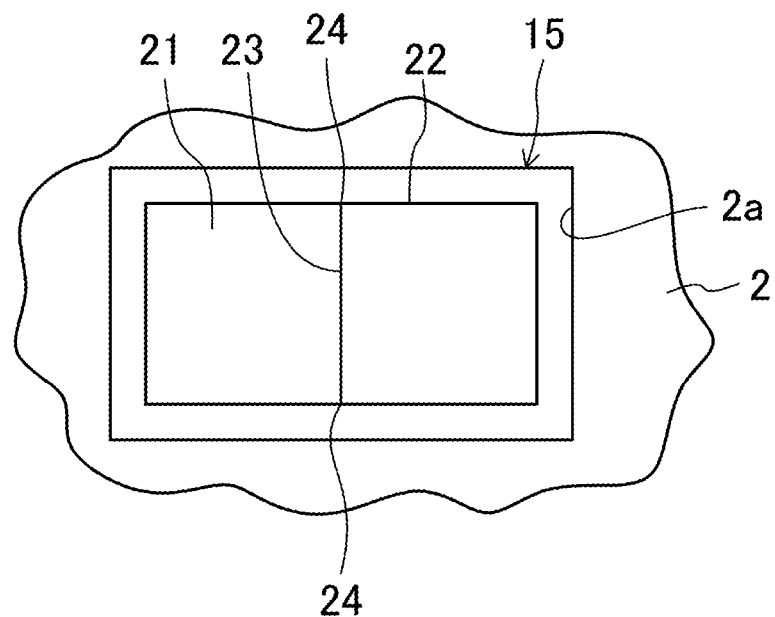
FIG. 14 is a plan view of a gas discharge valve of a battery of still another variation.

In the above-described embodiment, the planar shape of the valve body 21 is the track shape, but is not limited to above and may be a true circle shape, an oval shape, or a polygonal shape such as a quadrangular shape. Similarly, the planar shape of the main notch 22 formed at the outer peripheral portion of the valve body 21 is not limited to the track shape, and may be an annular shape such as a true circle shape, an oval shape, or a quadrangular shape. The main notch 22 is not necessarily formed in the closed annular shape, and may be in a substantially annular shape with a partially-disconnected portion. The planar shape of the valve body 21 and the planar shape of the main notch 22 may be different from each other. FIG. 14 shows one example in a case where the planar shapes of the valve body 21 and the main notch 22 are quadrangular shapes.

Figure 15:
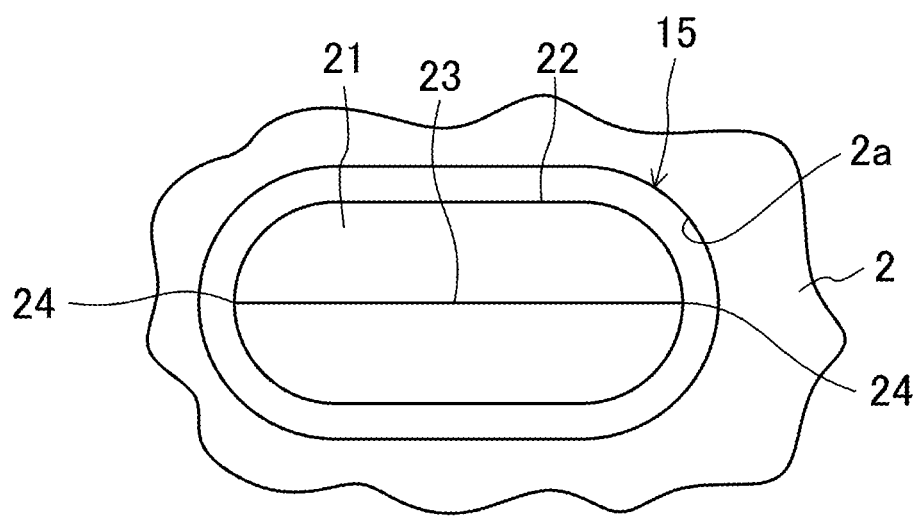
FIG. 15 is a plan view of a gas discharge valve of a battery of still another variation.

In the above-described embodiment, the auxiliary notch 23 is coupled to each linear portion of the main notch 22. Instead, the auxiliary notch 23 may be coupled to each curved portion of the main notch 22 as shown in FIG. 15, for example. Moreover, in the above-described embodiment, the auxiliary notch 23 is provided in the direction of the short axis of the main notch 22. Instead, the auxiliary notch 23 may be provided in the direction of the long axis of the main notch 22 as shown in FIG. 15, for example.

The invention claimed is:

1. A battery gas discharge valve formed at a battery, comprising:
a thin valve body to be opened to release gas from an inside to an outside of the battery when an internal pressure of the battery has reached a predetermined value or greater,
wherein the valve body includes a substantially annular main notch for opening the valve body and an auxiliary notch provided in a region inside the main notch,
the main notch and the auxiliary notch are coupled to each other at least at one location,
at a coupling portion between the main notch and the auxiliary notch, a curvature R1 of an inner corner of a bottom portion of the main notch is equal to or less than 0.05, and a curvature R2 of an outer corner of the bottom portion of the main notch is equal to or greater than 0.05, and
$t2/t1 \geq 0.16$ is satisfied t1 is a thickness of the valve body at a portion thereof located in the opposite direction of the auxiliary notch when viewed from the coupling portion, and t2 is a thickness of the valve body at a portion thereof located below the bottom portion of the main notch.

2. The battery gas discharge valve of claim 1, wherein a shape of the main notch is a track shape.

3. The battery gas discharge valve of claim 2, wherein the auxiliary notch is coupled perpendicularly to a linear portion of the main notch.

4. A battery comprising:
the battery gas discharge valve of claim 1.

* * * * *